April 20, 1965 J. S. MYLES 3,179,744
TELEVISION TEST SIGNAL GENERATOR
Filed Dec. 4, 1961 3 Sheets-Sheet 1

INVENTOR
JOHN S. MYLES
BY– Smart + Biggar.
ATTORNEYS.

INVENTOR
JOHN S. MYLES
BY— Smart & Biggar.
ATTORNEYS.

April 20, 1965 J. S. MYLES 3,179,744

TELEVISION TEST SIGNAL GENERATOR

Filed Dec. 4, 1961 3 Sheets-Sheet 3

INVENTOR
JOHN S. MYLES
BY- Smart + Biggar
ATTORNEYS.

3,179,744
TELEVISION TEST SIGNAL GENERATOR
John S. Myles, Kingsmere, Old Chelsea, Quebec, Canada, assignor to Northern Electric Company Limited, Montreal, Quebec, Canada
Filed Dec. 4, 1961, Ser. No. 156,903
6 Claims. (Cl. 178—6)

This invention relates to a television test signal generator and is particularly applicable for use with a television synchronizing generator which is locked in frequency with and has a predetermined phase relationship to a reference sinusoidal signal having the repetition rate of field scanning frequency.

A television test signal generator is often required to produce a test pattern on the screen of an image reproducing device, e.g. the screen of a television monitor, to gauge the performance of transmission circuits such as video amplifiers, clamping circuits and the overall operation of the video equipment present in a television studio. The desired test pattern on the screen of the monitor consists of a rectangular picture area of white D.C. picture level upon a picture field of black D.C. picture level. The normal picture area of a television monitor is formed by the application to the video input thereof of vertical and horizontal blanking pulses during the respective vertical, or field, and horizontal, or line, fly-back periods. The desired test pattern can be produced by deriving a signal which blanks out picture information before and after the vertical and horizontal fly-back periods and by applying this signal to the video input of the monitor in lieu of the normal video signal and blanking pulses.

It has been previously proposed to produce such a test pattern by processing pulses having the repetition rate of field and line scanning frequencies by means of a chain of four multivibrators each respectively establishing the vertical position and width and the horizontal position and width of the desired test pattern with a resultant composite series of pulses being applied to the video input of the monitor. This use of multivibrators is satisfactory for producing the horizontal pulses, as multivibrators are well suited for deriving relatively long pulses at the line repetition rate of 15.75 kc. However, it is much more difficult to derive long pulses by using multivibrators at the slower field repetition rate of 60 cycles per second. As a consequence, such a test signal generator would suffer in reliability and in any event, would necessitate severe design requirements. Furthermore, the previously proposed test signal generator involved complex circuitry and therefore tended to be relatively expensive to manufacture. The present invention provides a test signal generator which is not only very reliable but which is also very simple in construction and relatively inexpensive to manufacture.

According to the invention, a test signal generator is provided for use with a television synchronizing generator which is locked in frequency with, and has a predetermined phase relationship, to a reference sinusoidal signal having the repetition rate of field scanning frequency. The test signal generator comprises phase shifting means adapted to be responsive to a source of the reference sinusoidal signal to produce a further sinusoidal signal having the repetition rate of field scanning frequency and a predetermined phase relationship to vertical blanking pulses generated in the synchronizing generator. First pulse generating means responsive to a predetermined amplitude of the further sinusoidal signal produces a first series of equal pulses having the field repetition rate and of which the width of each pulse is greater than the width of a vertical blanking pulse generated in the synchronizing generator. Second pulse generating means adapted to be responsive to a source of trigger pulses derived from the synchronizing generator and having the repetition rate of twice line scanning frequency produces a second series of equal pulses having the line repetition rate and a predetermined phase relationship to horizontal blanking pulses generated in the synchronizing generator. Third pulse generating means responsive to the second series of pulses produces a third series of equal pulses having the line repetition rate and of which the width of each pulse is greater than the width of a horizontal blanking pulse generated in the synchronizing generator, and mixing means responsive to the first and third series of pulses produces the desired test signal which comprises a composite series of pulses.

According to the invention, the composite series of pulses are adapted to be applied to the screen of an image reproducing device, e.g. to the video input of a monitor, in lieu of a video signal including horizontal and vertical blanking pulses, to produce on the screen of the monitor the desired rectangular picture area of white D.C. picture level upon a picture field of black D.C. picture level.

The size and position of the test pattern can be readily controlled by suitably adjusting the parameters of the signal generator. The vertical position of the rectangular picture area can be adjusted by varying the time constant of the phase shifting means. The first pulse generating means preferably comprises a squaring amplifier and the relative position of the upper and lower sills of the rectangular picture area can be adjusted by varying the biasing or switching level of the squaring amplifier. The second pulse generating means preferably comprises a monostable multivibrator and the horizontal position of the rectangular picture area can be adjusted by suitably varying the time constant of the multivibrator. The third pulse generating means preferably comprises a differentiator and a squaring amplifier serially connected together and the relative position of the sides of the rectangular picture area can be adjusted by suitably varying the time constant of the differentiator.

A preferred embodiment of the invention will now be described, by way of example, with reference to the accompanying drawings in which.

Figures 1, 2:
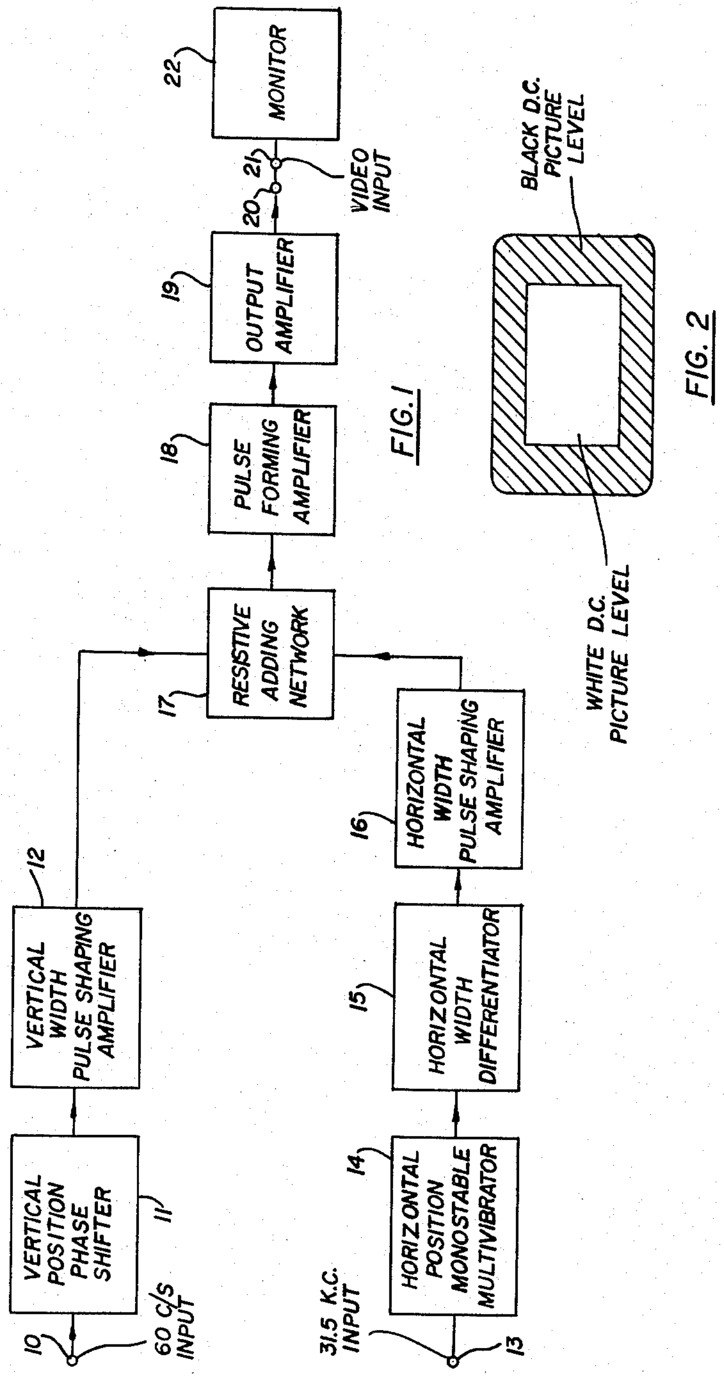
FIGURE 1 is a block diagram illustrating the invention.
FIGURE 2 is an illustration of a test pattern formed on the screen of a cathode ray tube by means of the arrangement illustrated in FIGURE 1.
Figure 3:
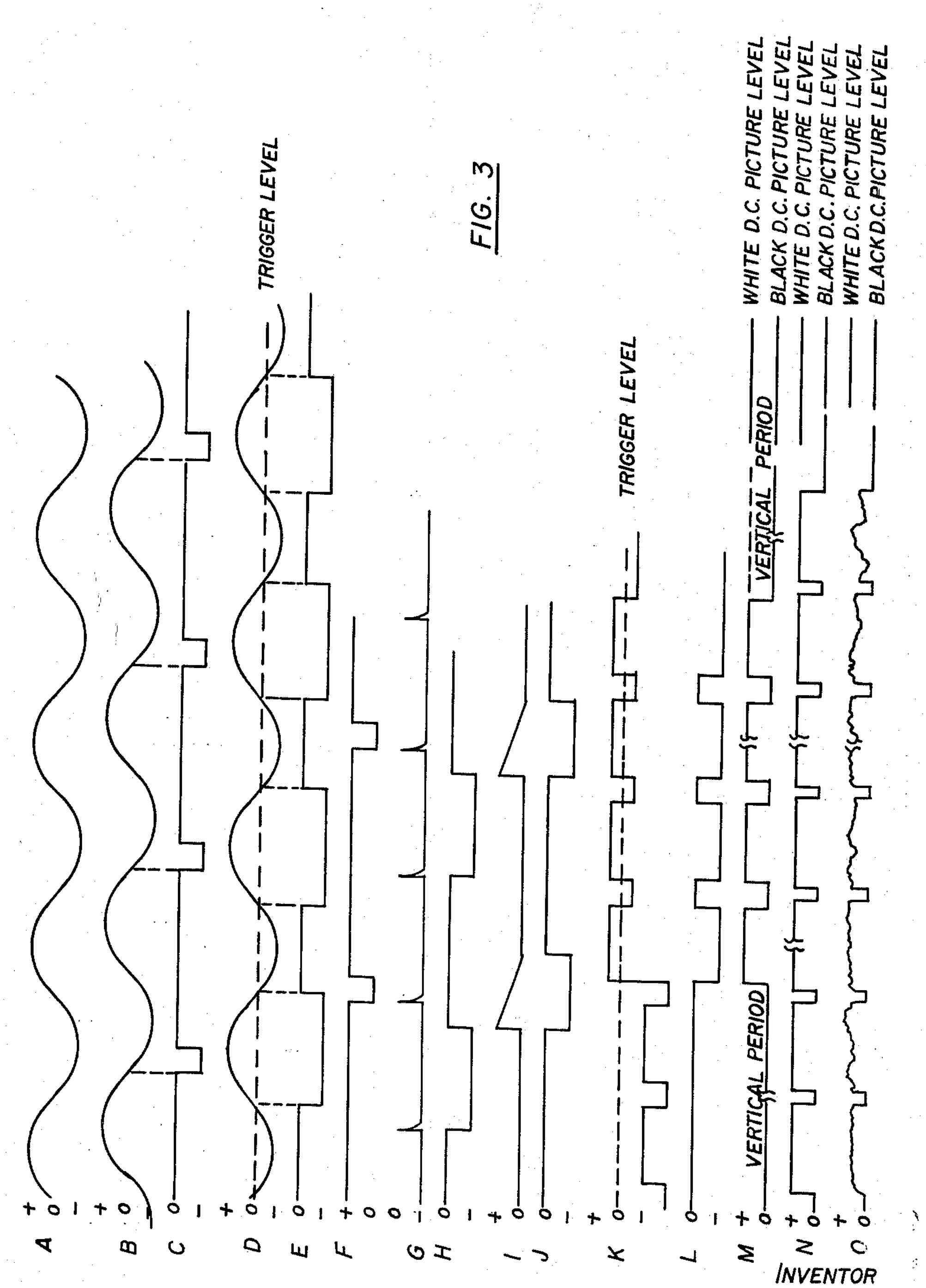
Figure 4:
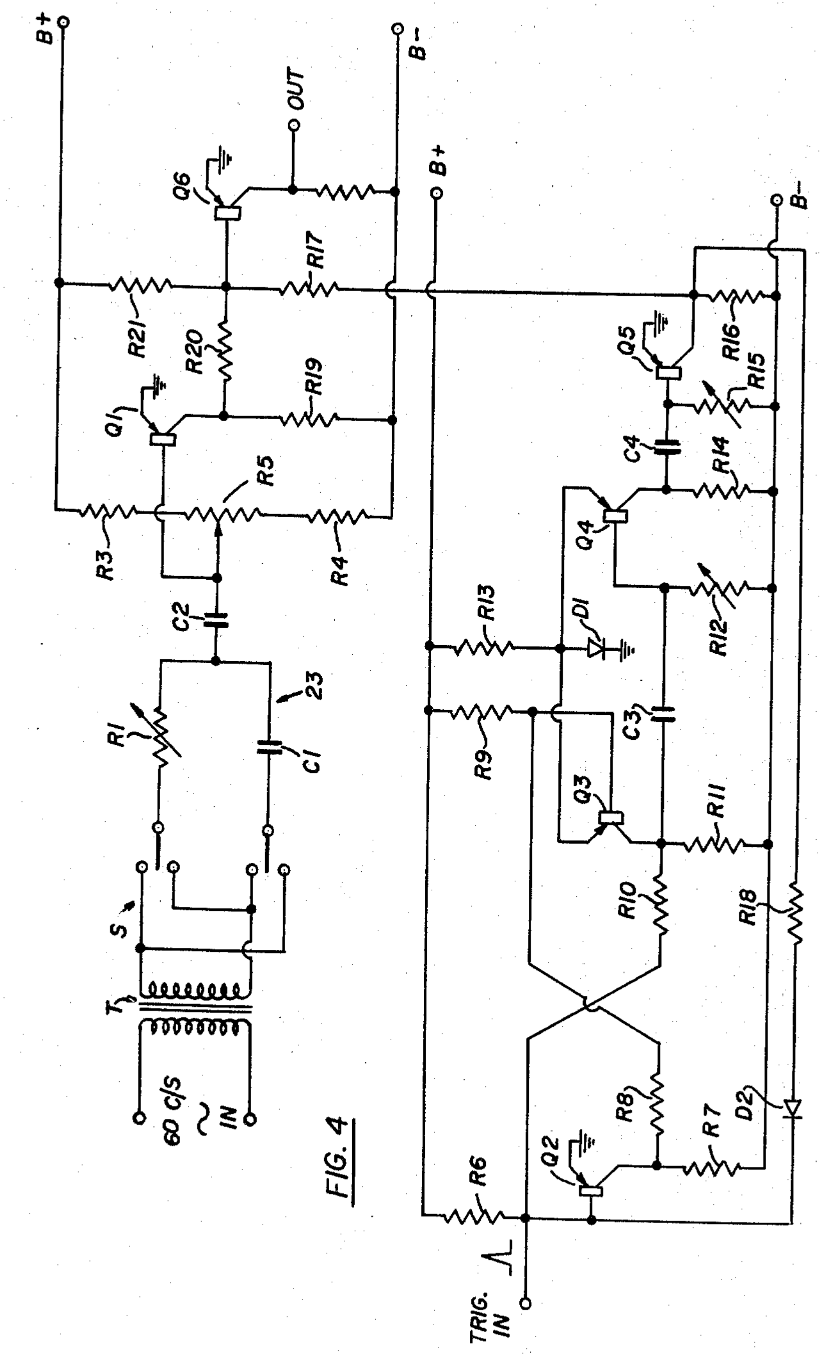

FIGURE 3 as a set of waveforms useful for understanding the arrangements illustrated in FIGURES 1 and 4 and FIGURE 4 is a schematic diagram of the arrangement illustrated in FIGURE 1.

Most television synchronizing generators are locked to a 60 cycle per second power line. This locking is achieved by circuitry incorporated in the synchronizing generator which is connected to a source of the reference 60 cycle per second frequency (the repetition rate of field scanning frequency). The source is shifted in phase and then applied to the synchronizing generator locking loop. The locking loop controls the internal 60 cycle per second frequency of the synchronizing generator such that it is equal to that of the source. Thus the synchronizing generator and 60 cycle per second pulses generated therein, such as the vertical blanking pulses, are locked in frequency with and have a predetermined phase relationship to the source. The amount of phase shift is normally determined when the synchronizing generator is installed and adjustments thereafter are infrequent.

Referring to FIGURE 1 of the drawings, an input terminal 10 is adapted to be connected to the same source of reference 60 cycle per second frequency to which the synchronizing generator is locked. The input 10 is coupled through a phase shifting means shown as a vertical position phase shifter 11 and a first pulse generating means shown as a vertical width pulse shaping amplifier 12. An input terminal 13 is adapted to be connected to a source of triggering pulses having the repetition rate of twice line scanning frequency or 31.5 kc., these triggering pulses being derived from the master oscillator of the synchronizing generator. The input terminal 13 is coupled through a second pulse generating means shown as a horizontal position monostable multivibrator 14 and a third pulse generating means shown as a horizontal width differentiator 15 and a horizontal width pulse shaping amplifier 16. The outputs from the amplifiers 12 and 16 are connected to separate inputs of a resistive adding network 17, the output of which is coupled through a pulse forming amplifier 18, the network 17 and amplifier 18 serving as a mixing means for the generated pulses from amplifiers 12 and 16. The output from the amplifier 18 is coupled through an output amplifier 19 to an output terminal 20. The output terminal 20 is adapted to be connected to the video input terminal 21 of an image reproducing device shown generally as a monitor 22. It is to be understood, although not shown in FIGURE 1, that horizontal and vertical synchronizing pulses derived from the synchronizing generator are connected to the composite synchronizing input of the monitor 22 in the conventional manner.

The operation of FIGURE 1 will be more readily understood with reference to the waveforms illustrated in FIGURE 3. Waveform A shows the reference sinusoidal signal to which the synchronizing generator is locked and which is applied to input terminal 10. Waveform B shows the reference sinusoidal signal after it has been shifted in phase before being applied to the synchronizing generator locking loop. Waveform C shows the vertical blanking pulses generated in the synchronizing generator and it can be seen that these vertical blanking pulses are in phase with the sinusoidal signal of waveform B. The vertical position phase shifter 11 receives the sinusoidal signal of waveform A from the input terminal 10 and shifts it in phase to produce a further sinusoidal signal having the field scanning repetition rate of 60 cycles per second as typically shown in waveform D. By comparing waveform D with waveforms B and C it can be seen that the time constant of the phase shifter 11 can be adjusted to produce a phase shift such that the further sinusoidal signal has a predetermined phase relationship to the vertical blanking pulses generated in the synchronizing generator. The vertical position of the desired test pattern, typically illustrated in FIGURE 2, is thus determined by the amplitude peak of the further sinusoidal signal (waveform D). The vertical width pulse shaping amplifier 12 responds to a predetermined amplitude of the further sinusoidal signal to produce a first series of equal pulses having the field repetition rate as shown in waveform E. The amplifier 12 includes means for varying its biasing or switching level to permit the width of each pulse of the first series to be wider than a vertical blanking pulse generated in the synchronozing generator. This predetermined biasing or switching level is typically illustrated in waveform D and establishes the vertical width of the desired test pattern shown in FIGURE 2. By comparing waveform E with waveform C, it can be seen that each pulse of the first series of pulses overlaps a vertical blanking pulse.

Waveform F shows the horizontal blanking pulses generated in the synchronizing generator and waveform G shows the trigger pulses having twice the line repetition rate (31.5 kc.) which are applied to the input terminal 13. The horizontal position monostable multivibrator 14 receives the trigger pulses from the input terminal 13 and by the process of frequency division, produces a second series of equal pulses having the line repetition rate of 15.75 kc. as typically shown in waveform H. By comparing waveform H with waveform F, it can be seen that the time constant of the multivibrator 14 can be adjusted such that the second series of pulses has a predetermined phase relationship to the horizontal blanking pulses generated in the synchronizing generator. This predetermined phase relationship of the second series of pulses thereby establishes the horizontal position of the desired test pattern shown in FIGURE 2. The horizontal width differentiator 15 differentiates the second series of pulses to produce waveform I and the horizontal width pulse shaping amplifier 16 produces from waveform I a third series of equal pulses having the line repetition rate, as typically shown in waveform J. The time constant of the differentiator 15 can be adjusted to permit the width of each pulse of the third series to be wider than a horizontal blanking pulse generated in the horizontal generator. Thus the time constant of the differentiator 15 establishes the horizontal width of the desired test pattern shown in FIGURE 2. By comparing waveform J with waveform F, it can be seen that each pulse of the third series of pulses overlaps a horizontal blanking pulse.

Waveforms E and J are applied to separate inputs of the resistive adding network 17, the output of which is shown in waveform K. Waveform K is applied to the pulse forming amplifier 18, the output of which is the desired test signal comprising a composite series of pulses and is shown as waveform L. The trigger level of the amplifier 18 is shown in waveform K and is established by a proper choice of resistance values in the resistive adding network 17 as will be described in more detail hereinafter with reference to FIGURE 4. Waveform L is applied to a conventional output amplifier 19 which provides a phase inversion and produces waveform M which appears at the output terminal 20. Waveforms N and O respectively show by way of comparison to waveform M the normal composite blanking signal and the blanking signal interspersed with video picture information. It can be readily seen that waveform M is at black D.C. picture level before and after the normal vertical and horizontal pulses. Waveform M is adapted to be applied to the video input 21 of the monitor 22 in lieu of the normal blanking information to produce on the screen of the monitor the desired test pattern as shown in FIGURE 2.

Reference will now be made to FIGURE 4 for a more detailed description of certain circuit components of FIGURE 1 which applicant has found to give satisfactory results in practising the invention. The 60 cycle per second sinusoidal signal is coupled through a transformer T, and a double pole-double throw switch S to a conventional phase shifting circuit 23 (phase shifter 11 of FIGURE 1). The phase shifting circuit 23 comprises a variable resistor R1 and a capacitor C1. By adjusting the value of resistor R1, the phase shifting circuit 23 is capable of producing a phase shift of somewhat less than 360 degrees, each position of the switch S producing slightly less than 180 degrees of adjustment. The output from the phase shifting circuit 23 is coupled through a capacitor C2 to the base of a non-linear transistor amplifier Q1 (amplifier 12 of FIGURE 1) and to a biasing chain comprising resistors R3 and R4 and potentiometer R5. The biasing or switching level of the transistor Q1 is controlled by the setting of the potentiometer R5. Thus, the position and the width of the pulses appearing at the collector of the transistor Q1 (waveform E of FIGURE 3) are respectively determined by the resistor R1 and the potentiometer R5.

The monostable multivibrator 14 of FIGURE 1 comprises transistors Q2, Q3, Q4 and associated circuitry. The 31.5 kc. trigger pulses are applied to the base of the transistor Q2 across its load resistor R6. The output from the transistor Q2 is taken across its collector load resistor R7 and coupled to the base of the transistor Q3 through a resistor R8 across its base load resistor R9. The base of the transistor Q2 is also coupled through a reistor R10 to the collector of the transistor Q3. The output from the transistor Q3 is taken across its collector load resistor R11 and is reactively coupled through a capacitor C3 to the base of the transistor Q4 which is referenced to a source of negative potential through a variable resistor R12. The emitters of the transistors Q3 and Q4 are connected together and the junction thereof is connected between the common emitter resistor R13 and a diode D1.

In the standby condition (in the absence of trigger pulses at the base of the transistor Q2), the transistor Q2 is conducting, holding the transistor Q3 non-conducting which in turn holds the transistor Q4 conducting. When the base of the transistor Q3 is triggered, the transistor Q2 ceases to conduct, causing the transistor Q3 to conduct. The collector of the transistor Q3 goes more negative and through the capacitor C3, which charges, causes the transistor Q4 to become non-conducting. The transistor Q4 will remain non-conducting until the charge on the capacitor C3 has leaked off through the resistor R12 at which time it will conduct again and cause the transistor Q3 to become non-conducting. The collector of the transistor Q3 will cause the transistor Q2 to conduct again and the cycle is complete. The time constant of the multivibrator can be adjusted by varying the value of the resistor R12.

The output from the transistor Q4 is taken across its collector load resistor R14 and is coupled to the base of a transistor amplifier Q5 through a network comprising a capacitor C4 and a variable resistor R15. The differentiator 15 and the amplifier 16 of FIGURE 1 respectively comprise the network C4–R15 and the transistor Q5. The time constant of the network C4–R15 can be adjusted by varying the value of the resistor R15. Thus, the position and the width of the pulses appearing at the collector of the transistor Q5 (waveform J of FIGURE 3) are respectively determined by the resistors R12 and R15. The output from the transistor Q5 is taken across its collector load resistor R16 and coupled through a resistor R17 to the base of a transistor Q6. The collector of the transistor Q5 is also connected through a feed back path comprising a resistor R18 and a diode D2 to the base of the transistor Q2. The output from the transistor Q1 (amplifier 12 of FIGURE 1) is taken across its collector load resistor R19 and coupled through a resistor R20 to the base of the transistor Q6. The junction of resistors R17 and R20 is connected through a resistor R21 to a source of positive potential. The resistive adding network 17 and the amplifier 18 of FIGURE 1 respectively comprise the resistors R17, R20, R21 and the transistor Q6.

Referring again to the waveforms of FIGURE 3, the output from the transistor Q1 comprises a series of negative pulses as shown in waveform E occurring at the rate of 60 cycles per second and the output from the transistor Q5 comprises a series of negative pulses as shown in waveform J occurring at the rate of 15.75 kc. By the proper selection of values for resistors R17, R20 and R21, the input to the base of the transistor Q6 will comprise, during the vertical period, pulses of waveform E interrupted by pulses of waveform J which will be a completely negative waveform as shown in the first part of waveform K. At the end of the vertical period, only the pulses of waveform J appear at the base of the transistor Q6 which will appear as pulses occurring at the rate of 15.75 kc. going from positive to negative as shown in the second part of waveform K. As shown in waveform K, the trigger level of the transistor Q6 is selected at ground and the transistor Q6 conducts every time the waveform K goes negative to produce at its collector output the waveform L.

Thus according to the present invention a television test signal generator has been provided which is very reliable in operation and relatively simple in terms of its design complexity.

What I claim as my invention is:

1. In or for a television synchronizing generator wherein the synchronizing generator is locked in frequency with and has a predetermined phase relationship to a reference sinusoidal signal having the repetition rate of field scanning frequency, a television test signal generator comprising phase shifting means adapted to be responsive to a source of said reference sinusoidal signal to produce a further sinusoidal signal having the repetition rate of field scanning frequency and a predetermined phase relationship to vertical blanking pulses generated in the synchronizing generator, first pulse generating means responsive to a predetermined amplitude of said further sinusoidal signal to produce a first series of equal pulses having the field repetition rate and of which the width of each pulse is greater than the width of a vertical blanking pulse generated in the synchronizing generator, second pulse generating means adapted to be responsive to a source of trigger pulses derived from the synchronizing generator and having the repetition rate of twice line scanning frequency to produce a second series of equal pulses having the line repetition rate and a predetermined phase relationship to horizontal blanking pulses generated in the synchronizing generator, third pulse generating means responsive to said second series of pulses to produce a third series of equal pulses having the line repetition rate and of which the width of each pulse is greater than the width of a horizontal blanking pulse generated in the synchronizing generator, and mixing means responsive to said first and third series of pulses to produce a test signal comprising a composite series of pulses.

2. A television test signal generator as defined in claim 1 wherein said composite series of pulses is adapted to be applied to the video input of an image reproducing device in lieu of a video signal including horizontal and vertical blanking pulses to produce on the image reproducing device a rectangular picture area of white D.C. picture level upon a picture field of black D.C. picture level.

3. A television test signal generator as defined in claim 2 wherein the predetermined phase relationship of the further sinusoidal signal to vertical blanking pulses is rendered adjustable by varying the time constant of the phase shifting means to establish the vertical position of said rectangular picture area.

4. A television test signal generator as defined in claim 3 wherein said first pulse generating means comprises a squaring amplifier including means for varying the biasing or switching amplitude level of the amplifier to permit each pulse of said first series to be variable in width, thereby establishing the relative position of the upper and lower sills of said rectangular picture area.

5. A television test signal generator as defined in claim 4 wherein said second pulse generating means comprises a monostable multivibrator wherein the phase relationship of said second series of pulses is rendered adjustable by varying the time constant of the monostable multivibrator to establish the horizontal position of said rectangular picture area.

6. A television test signal generator as defined in claim 5 wherein said third pulse generating means comprises a differentiator and a squaring amplifier serially connected together; wherein each pulse of said third series is rendered variable in width by varying the time constant of the differentiator to establish the relative position of the sides of said rectangular picture area.

References Cited by the Examiner

UNITED STATES PATENTS

| | | | |
|---|---|---|---|
| 2,595,646 | 5/52 | Doba | 178—6 |
| 2,881,388 | 4/59 | Behrend | 328—188 |

DAVID G. REDINBAUGH, *Primary Examiner.*

ROY LAKE, *Examiner.*